(12) United States Patent
Oura

(10) Patent No.: US 7,965,311 B2
(45) Date of Patent: Jun. 21, 2011

(54) APPARATUS AND RECORDING MEDIUM FOR PATCHING DIVISIONAL IMAGES TO FORM A RE-SYNTHESIZED IMAGE

(75) Inventor: Seiji Oura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1288 days.

(21) Appl. No.: 11/545,913

(22) Filed: Oct. 11, 2006

(65) Prior Publication Data

US 2007/0091120 A1   Apr. 26, 2007

(30) Foreign Application Priority Data

Oct. 13, 2005   (JP) ............................... P2005-299460

(51) Int. Cl.
H04N 7/00    (2011.01)
H04N 5/66    (2006.01)
H04N 5/225   (2006.01)
(52) U.S. Cl. .................. 348/38; 348/383; 348/218.1
(58) Field of Classification Search ............ 348/36, 348/38, 218.1, 383, 385.1, 387.1, 607, 581; 349/73; 345/1.3
See application file for complete search history.

(56) References Cited

U.S. PATENT DOCUMENTS

| | | | | |
|---|---|---|---|---|
| 4,797,942 A | * | 1/1989 | Burt .............................. | 382/284 |
| 5,430,486 A | * | 7/1995 | Fraser et al. ............... | 348/426.1 |
| 6,020,868 A | * | 2/2000 | Greene et al. ................... | 345/88 |
| 6,097,430 A | * | 8/2000 | Komiya et al. ............ | 348/218.1 |
| 6,211,911 B1 | * | 4/2001 | Komiya et al. ............ | 348/218.1 |
| 6,611,241 B1 | * | 8/2003 | Firester et al. ................ | 345/1.3 |
| 6,731,338 B1 | * | 5/2004 | Lin ............................... | 348/323 |
| 6,774,868 B1 | * | 8/2004 | Bowen ........................ | 345/1.1 |
| 7,570,227 B2 | * | 8/2009 | MacKinlay .................... | 345/1.3 |
| 2003/0086003 A1 | * | 5/2003 | Koga ......................... | 348/218.1 |

FOREIGN PATENT DOCUMENTS

| | | |
|---|---|---|
| JP | 5 183891 | 7/1993 |
| JP | 6 245192 | 9/1994 |
| JP | 6 337930 | 12/1994 |
| JP | 9 18698 | 1/1997 |
| JP | 11 127325 | 5/1999 |
| JP | 2000 324337 | 11/2000 |
| JP | 2002 32063 | 1/2002 |
| JP | 2002 49914 | 2/2002 |
| JP | 2003 46782 | 2/2003 |
| JP | 2005 117266 | 4/2005 |
| JP | 2005 339144 | 12/2005 |
| JP | 2006 268809 | 10/2006 |
| JP | 2007 67499 | 3/2007 |

* cited by examiner

*Primary Examiner* — Victor Kostak
(74) *Attorney, Agent, or Firm* — Frommer Lawrence & Haug LLP; William S. Frommer; Thomas F. Presson

(57) ABSTRACT

An image display system includes a dividing apparatus which signals N divisional images formed by dividing a source image and having no overlap with each other, N transmission lines which transmit the N divisional images, N dummy pixel insertion sections which produce and insert dummy pixels based on the divisional images to the outer side of the images to produce expanded images, and N image processing sections which apply a spatial signal process to the expanded images. The image display system further includes N divisional image cutting out sections which remove image components of the dummy pixels from the spatially processed images to cut out images of a size equal to that of the inputted divisional images and an image synthesis section which patches the cut out divisional images to produce a re-synthesized image of a size equal to that of the source image.

13 Claims, 19 Drawing Sheets

FIG. 1A
2K IMAGE 
2K IMAGE 
2K IMAGE 
2K IMAGE 
FIG. 1B
4K × 2K IMAGE

B

FIG.9
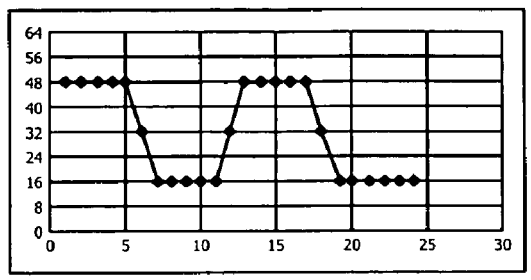
(1) ORIGINAL IMAGE SIGNAL
DELAYING PROCESS
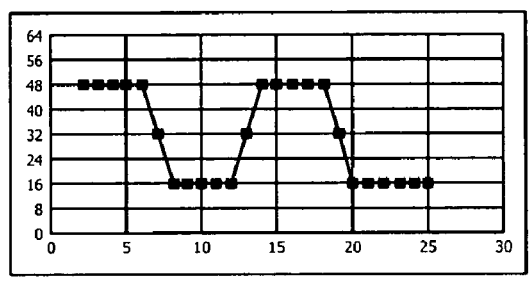
(2) DELAYED IMAGE SIGNAL
REMOVE DC COMPONENT BY (1)-(2)
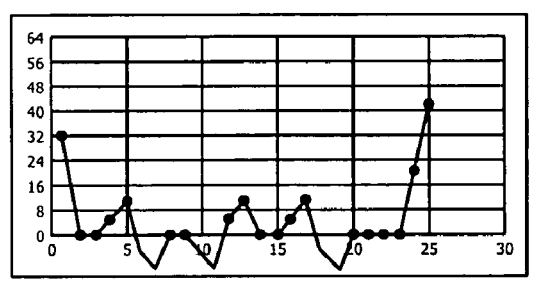
(3) HIGH FREQUENCY COMPONENT OF IMAGE SIGNAL
PRODUCE IMAGE WITH EMPHASIZED CONTOUR BY $((1)+ \alpha \cdot (3))$
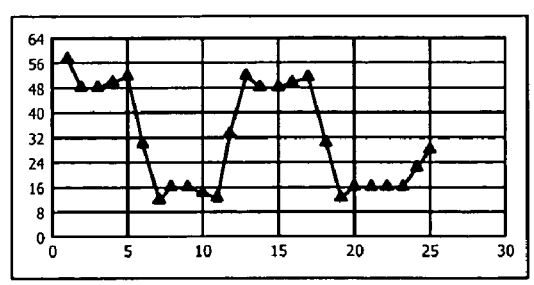
(4) IMAGE SIGNAL WITH EMPHASIZED CONTOUR

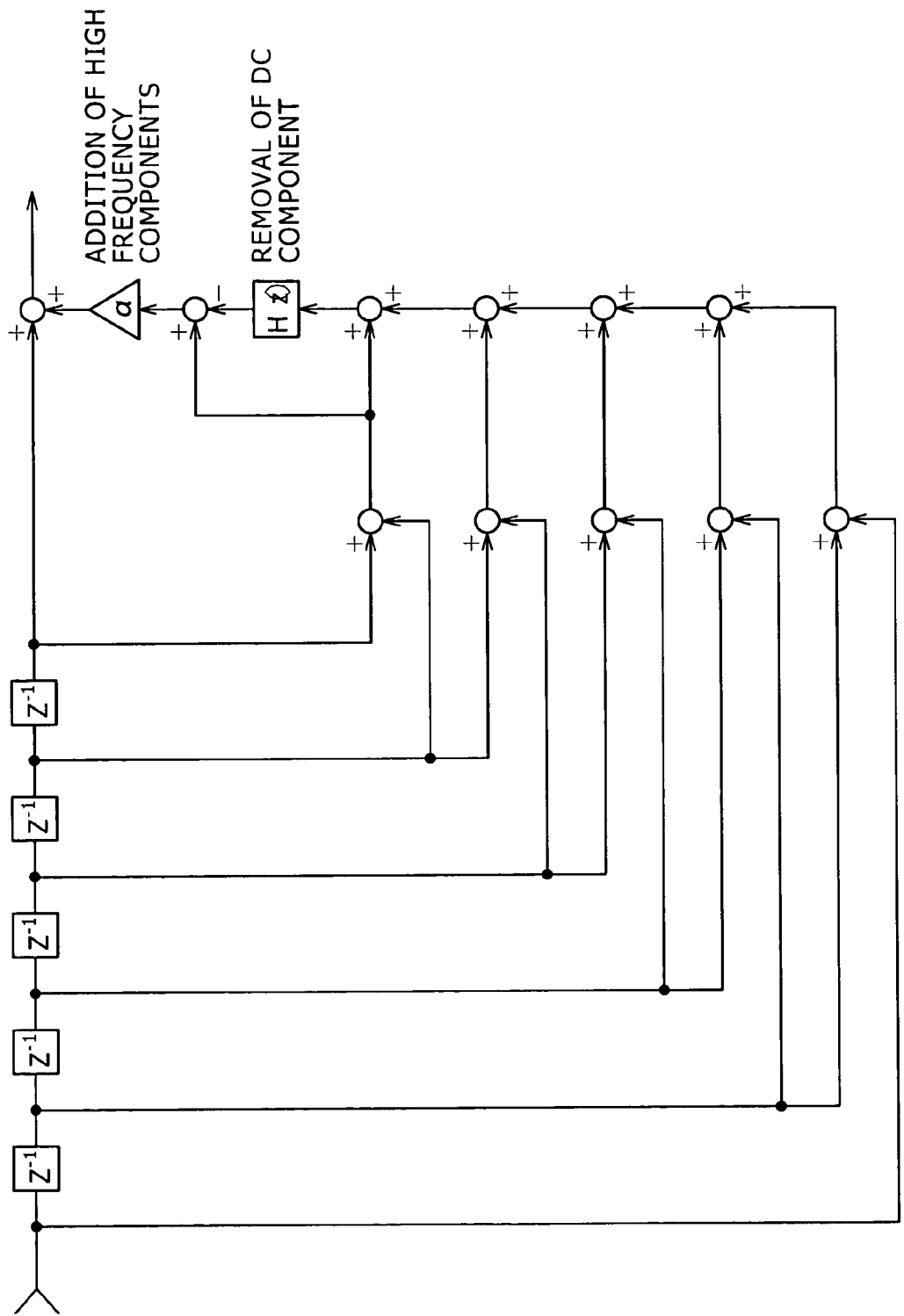

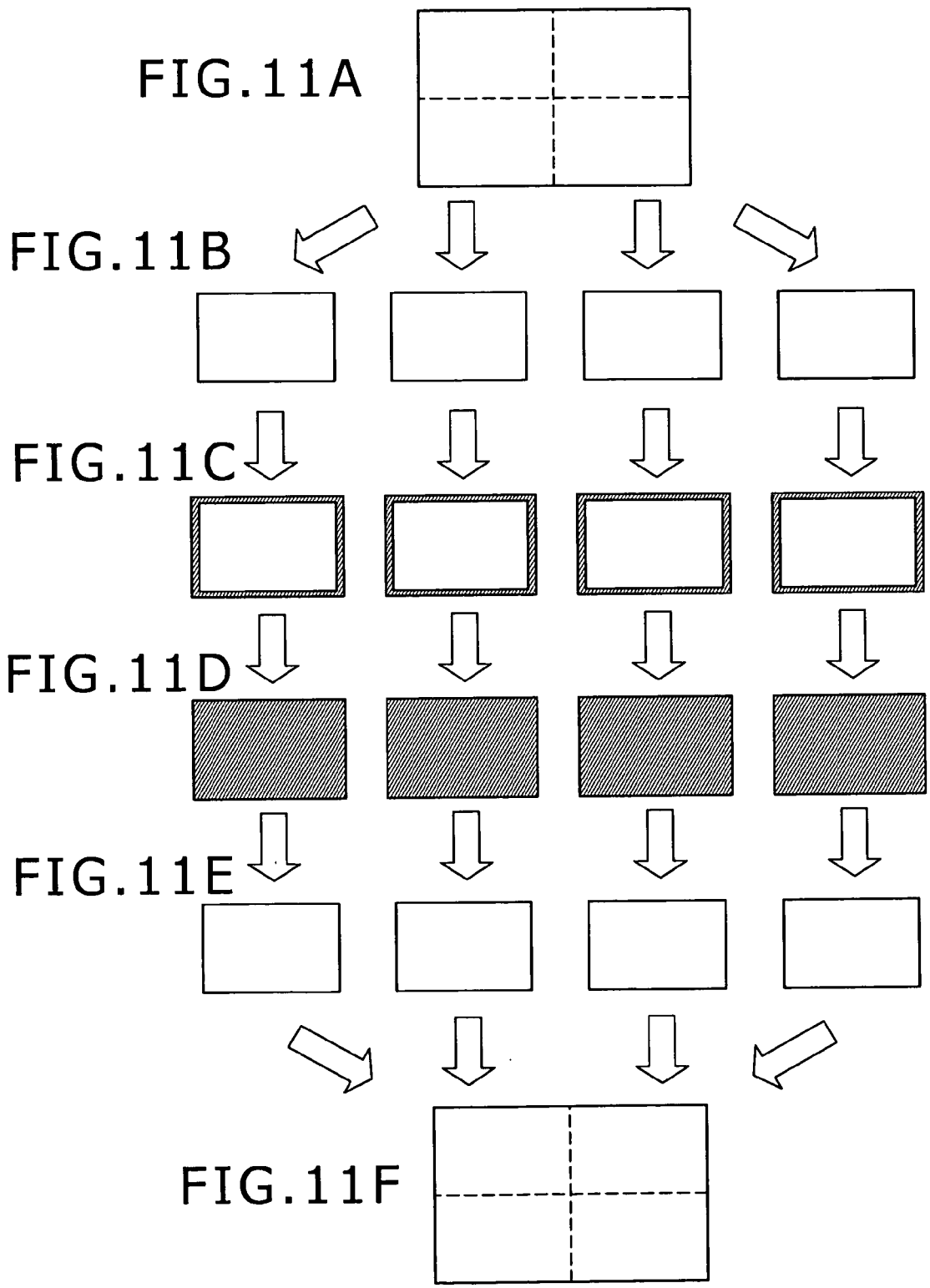

FIG. 12A
2K IMAGE 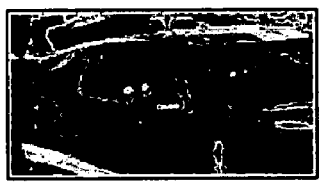
2K IMAGE 
2K IMAGE 
2K IMAGE 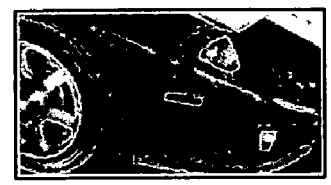
FIG. 12B
4K × 2K IMAGE
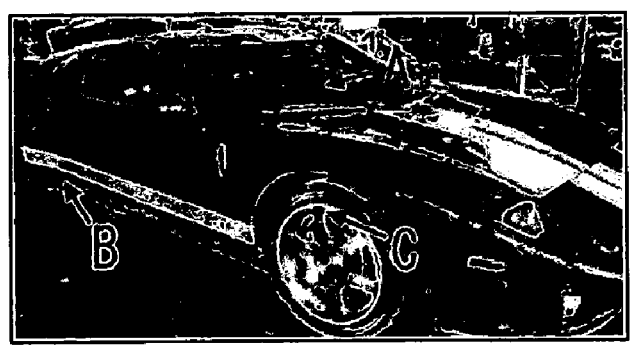

APPARATUS AND RECORDING MEDIUM FOR PATCHING DIVISIONAL IMAGES TO FORM A RE-SYNTHESIZED IMAGE

CROSS REFERENCES TO RELATED APPLICATIONS

The present invention contains subject matter related to Japanese Patent Application JP 2005-299460 filed with the Japanese Patent Office on Oct. 13, 2005, the entire contents of which being incorporated herein by reference.

BACKGROUND OF THE INVENTION

1. Field of the Invention

This invention relates to an information display system, a display apparatus, an image re-synthesis apparatus, an image re-synthesis method and a recording medium wherein divisional images formed by dividing a source image such that the images of neighboring regions may not overlap with each other are patched to produce a re-synthesized image.

2. Description of the Related Art

Together with the enhancement of the performance of computers, an environment in which an image can be processed at a free resolution has been and is being prepared. Together with the preparation of the environment, development of a system is being proceeded by which an image of a very high resolution much higher than the high definition (HD) resolution can be processed.

For example, development of a system is being proceeded by which an image of a pixel size of four times that of an HD image of the 2K size (such an HD image is hereinafter referred to as "2K image"), that is, a 4K×2K image, can be processed.

For the development of a system, effective utilization of an existing system and/or a large scale integrated circuit (LSI) is effective.

For example, a technique is expected wherein a screen of a 4K×2K image is divided into divisional screens of the 2K image size and the resulting four 2K images are processed by an existing system or a large scale integrated circuit and then re-synthesized or patched.

If a 4K×2K image is divided into four 2K images and the four 2K images are processed independently of one another and then re-synthesized to produce a 4K×2K image in this manner, then the development period of a processing system for a very high resolution image can be reduced significantly. In addition, this is effective also for construction of a processing system for a very high resolution image at a low cost refer to, for example Japanese Patent Laid-open No. 2005-117266.

SUMMARY OF THE INVENTION

However, existing systems and large scale integrated circuits are not initially designed for processing of divisional images formed by dividing a source image.

Therefore, each of 2K images after division is processed independently of the other 2K images. The signal process executed in this instance generally includes a process (spatial process) of working spatial frequencies of the image.

However, when the four divisional images (2K images) spatially processed independently of one another are re-synthesized to produce a 4K×2K image, disorder of an image is sometimes confirmed in the proximity of the boundary between the synthesized divisional images.

It is considered that this arises from the fact that pixel information conveniently provided to pixels at an outer edge portion of a divisional image upon spatial processing of pixels positioned in the proximity of the outer edge portion of the divisional image is fetched. Such pixel information as mentioned above is provided by providing black or gray pixels or uncertain pixels conveniently to the outer side of the divisional image when an arithmetic operation process is executed.

This phenomenon is described in connection with a particular example. FIGS. 1A and 1B show an example of screens of divisional images, that is, 2K images, and a 4K×2K image, respectively. In particular, FIG. 1A shows divisional images (2K images), and FIG. 1B shows a 4K×2K image obtained by spatially processing the divisional images of FIG. 1A independently of one another and then re-synthesizing the processed divisional images.

FIGS. 2 to 4 show each an enlarged view of a portion of divisional images around the boundary between the divisional images.

FIG. 2 shows an enlarged view of a portion indicated by an arrow mark A in FIG. 1B. In particular, FIG. 2 shows an enlarged view of a portion in the proximity of the boundary between two right and left divisional images positioned on the upper stage of FIG. 1A. As seen in FIG. 2, a stripe extending in the vertical direction can be seen at the boundary position between the two divisional images.

FIG. 3 shows an enlarged view of another portion indicated by an arrow mark B in FIG. 1B. In particular, FIG. 3 shows an enlarged view of a portion in the proximity of the boundary between two upper and lower divisional images positioned on the left side of FIG. 1A. As seen in FIG. 3, a stripe extending in the horizontal direction can be seen at the boundary position between the two divisional images.

FIG. 4 shows an enlarged view of a further portion indicated by an arrow mark C in FIG. 1B. In particular, FIG. 4 shows an enlarged view of a portion in the proximity of the boundary between two right and left divisional images positioned on the lower stage of FIG. 1A. As seen in FIG. 4, a stripe extending in the vertical direction can be slightly seen at the boundary position between the two divisional images.

In this manner, if an existing system or the like is applied as it is, then disorder of an image occurs in the proximity of a boundary between divisional images and deteriorates the quality of the resulting 4K×2K image.

Therefore, it is demanded to provide an information display system, a display apparatus, an image re-synthesis apparatus, an image re-synthesis method and a recording medium wherein divisional images formed by dividing a source image such that the images of neighboring regions may not overlap with each other can be patched to produce a re-synthesized image on which discontinuity cannot be perceived readily at a boundary portion between neighboring divisional images.

According to an embodiment of the present invention, there is provided an image display system including a dividing apparatus, N transmission lines, N dummy pixel insertion sections, N image processing sections, N divisional image cutting out sections, and an image synthesis section. The dividing apparatus configured to divide a source image into N divisional images such that the images of neighboring regions may not overlap with each other and signal the N divisional images, N being a natural number equal to or greater than two. The N transmission lines configured to individually transmit the N divisional images. The N dummy pixel insertion sections configured to produce dummy pixels individually based on the corresponding divisional images and insert the produced dummy images individually to the outer side of the corresponding images to produce expanded images. The N image processing sections configured to apply a spatial signal process individually to the corresponding expanded images. The N divisional image cutting out sections configured to remove image components corresponding to the dummy pixels individually from the corresponding spatially processed images to cut out divisional images of an image size equal to the size of the divisional images signaled from the dividing apparatus. The image synthesis section configured to patch the cut out N divisional images to produce a re-synthesized image of an image size equal to the image size of the source image.

With the image display system, even where divisional images formed by dividing a source image such that the images of neighboring regions may not overlap with each other between neighboring regions are inputted, upon re-synthesis of the divisional images, otherwise possible deterioration of the picture quality of the image in the proximity of the boundary between neighboring divisional images can be prevented.

BRIEF DESCRIPTION OF THE DRAWINGS

FIGS. 1A and 1B are schematic views illustrating a relationship between divisional images, that is, 2K images and a 4K×2K image;

FIG. 9 is a diagrammatic view illustrating a principle of a contour emphasis process;

FIG. 10 is a circuit diagram showing an example of a configuration of a filter which can perform a contour emphasis process;

FIGS. 11A to 11F are schematic views illustrating the substance of a series of processes executed by the image display system;

FIGS. 12A and 12B are schematic views showing divisional images each in the form of a 2K image to be re-combined and a 4K×2K image after re-combined, respectively;

DETAILED DESCRIPTION OF THE PREFERRED EMBODIMENTS

Figure 2:
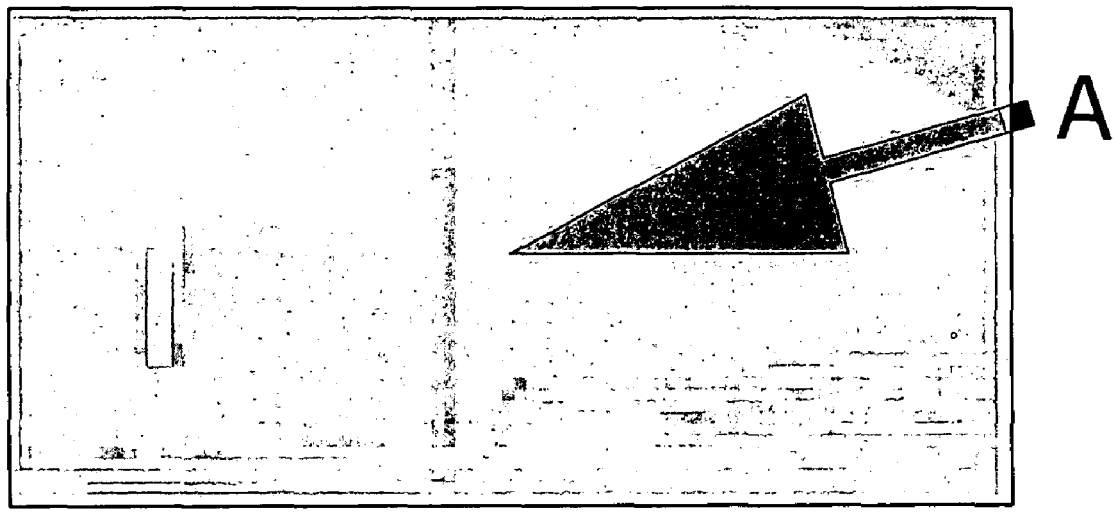
FIG. 2 is an enlarged view of a portion of two right and left divisional images positioned on the upper stage of FIG. 1A around a boundary between divisional images.

In the following, an image display system which incorporates a processing function according to an embodiment of the present invention is described.

It is to be noted that, to any portion which is not illustrated specifically in the drawings or not described specifically in the specification, a technique well known or publicly known in the pertaining technical field is applied.

It is also to be noted that embodiments described below are one of the preferred embodiments of the present invention, and it is not limited to these.

(A) Example of the Image Display System (A-1) General Configuration

Here, an image display system wherein an image of the 4K×2K resolution is divided into and transmitted as images of the full HD resolution and is re-constructed into an image of the 4K×2K resolution by the display apparatus side is described.

Figure 5:
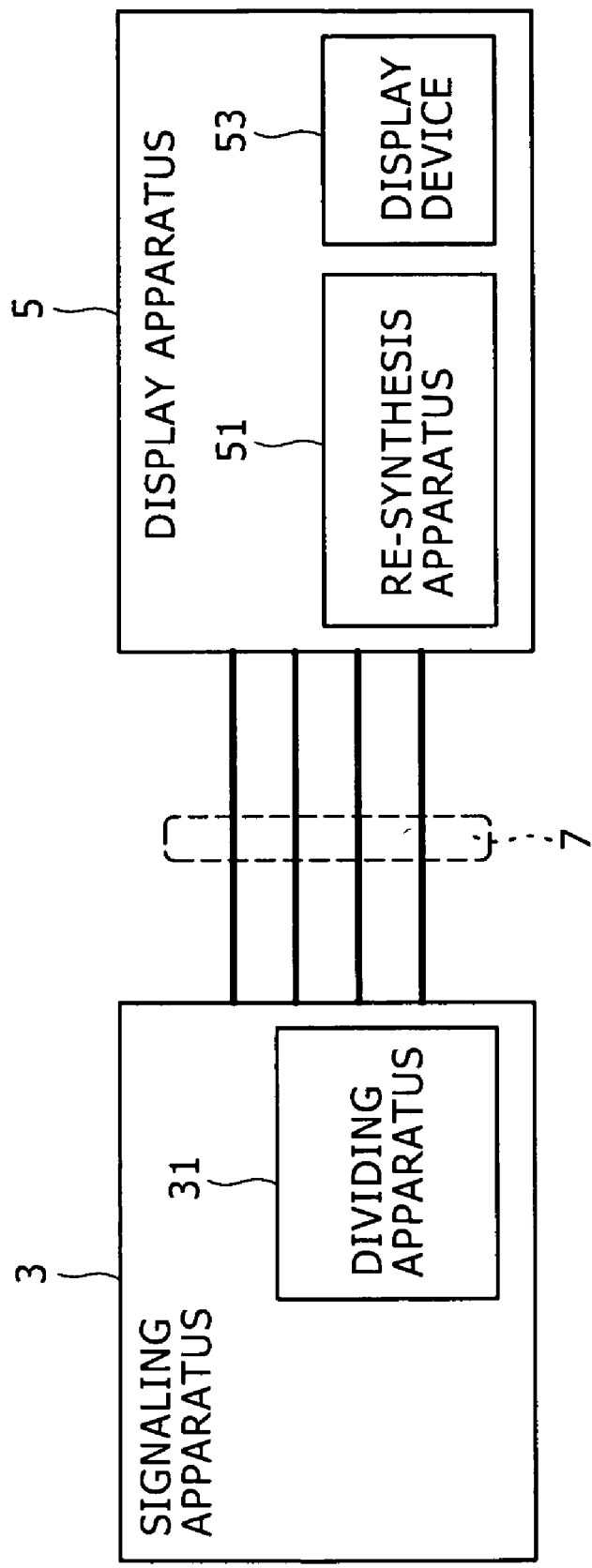
FIG. 5 is a block diagram showing an example of an image display system to which the present invention is applied.

FIG. 5 shows an example of a form of the image display system. Referring to FIG. 5, the image display system 1 shown includes a signaling apparatus 3 and a display apparatus 5. It is to be noted that, although the signaling apparatus 3 and the display apparatus 5 may be configured such that they are accommodated in a common housing, the following description is given of a case wherein the signaling apparatus 3 and the display apparatus 5 are accommodated in housings independent of each other.

The signaling apparatus 3 is an image processing apparatus which divides an image of the 4K×2K resolution into images of the full HD resolution and signals the divisional images as four data streams.

The signaling apparatus 3 may be, for example, an image pickup camera, a reproduction apparatus, a switcher or some other image processing apparatus. The signaling apparatus 3 incorporates an internal configuration suitable for the commodity form of the image processing apparatus and a dividing apparatus 31. The dividing apparatus 31 executes a process of dividing an image given with the 4K×2K resolution into four images of an image size of the full HD resolution.

In the present embodiment, an existing transmission line standardized by the HD-SDI standard or the like is used for transmission of an image of the full HD resolution. In this instance, the transmission line does not permit such irregular application as transmission of additional information which does not comply with the standard. Therefore, the dividing apparatus 31 divides an image of the 4K×2K resolution into images of one of standard sizes of existing image formats.

For example, if an image of the 4K×2K resolution is given by 3,840 pixels and 2,160 pixels in the horizontal and vertical directions, respectively, then the dividing apparatus 31 divides the image of the 4K×2K resolution into images of a resolution given by 1,920 pixels and 1,080 pixels in the horizontal and vertical directions, respectively.

On the other hand, for example, if the image of the 4K×2K resolution is given by 4,096 pixels and 2,160 pixels in the horizontal and vertical directions, respectively, the dividing apparatus 31 divides the image into images of a resolution given by 2,048 pixels and 1,080 pixels in the horizontal and vertical directions, respectively.

Thereupon, the 4K×2K image as a source image is divided into four divisional images which do not overlap with each other.

Figure 6A:
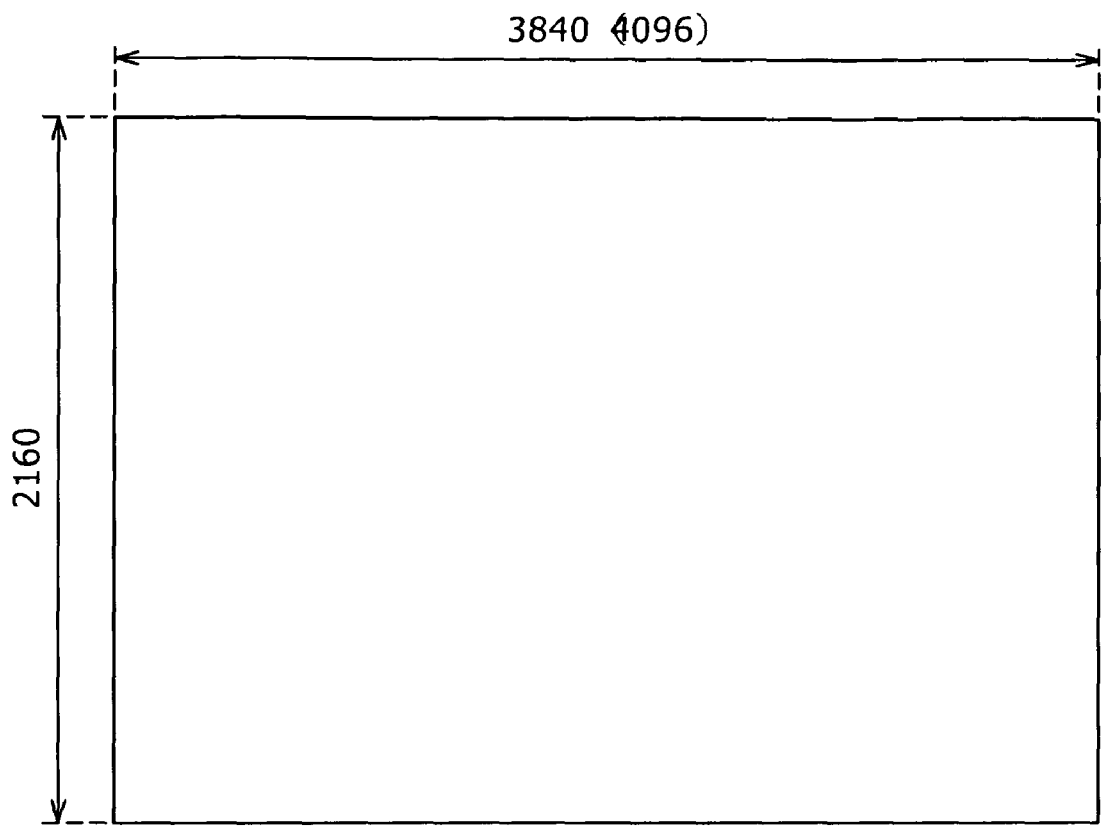
FIGS. 6A and 6B are schematic views illustrating a relationship in image size between a source image and a divisional image.
Figure 6B:
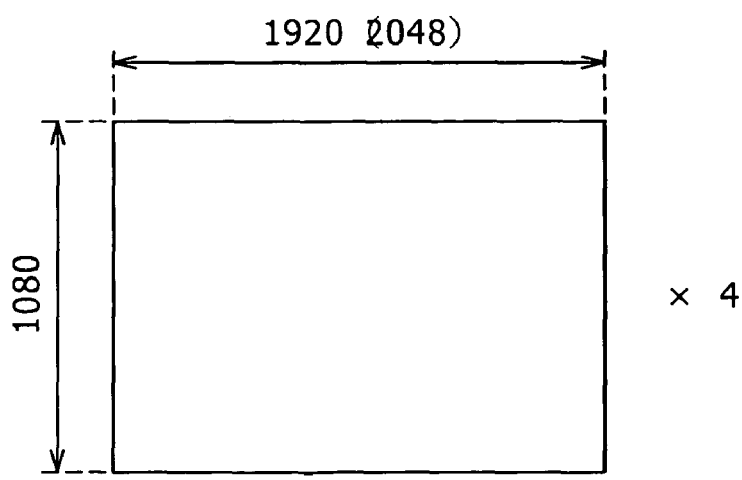

FIGS. 6A and 6B illustrate such a relationship in division as described above. In particular, FIG. 6A shows the pixel size of a 4K×2K image as a source image, and FIG. 6B shows the pixel size of an image of the full HD resolution which is a 2K image.

Referring back to FIG. 5, the display apparatus 5 includes a re-synthesis apparatus 51 for re-synthesizing a single 4K×2K image from four 2K images, and a display device 53 for displaying the re-synthesized 4K×2K image. The display apparatus 5 may have a direct vision type display system, a projection type display system or the like. For example, a projector as well as a flat panel display apparatus can be applied. Further, the display apparatus 5 may be a product for universal use or for business use.

(A-2) Configuration of the Image Re-Synthesis Apparatus

Figure 7:
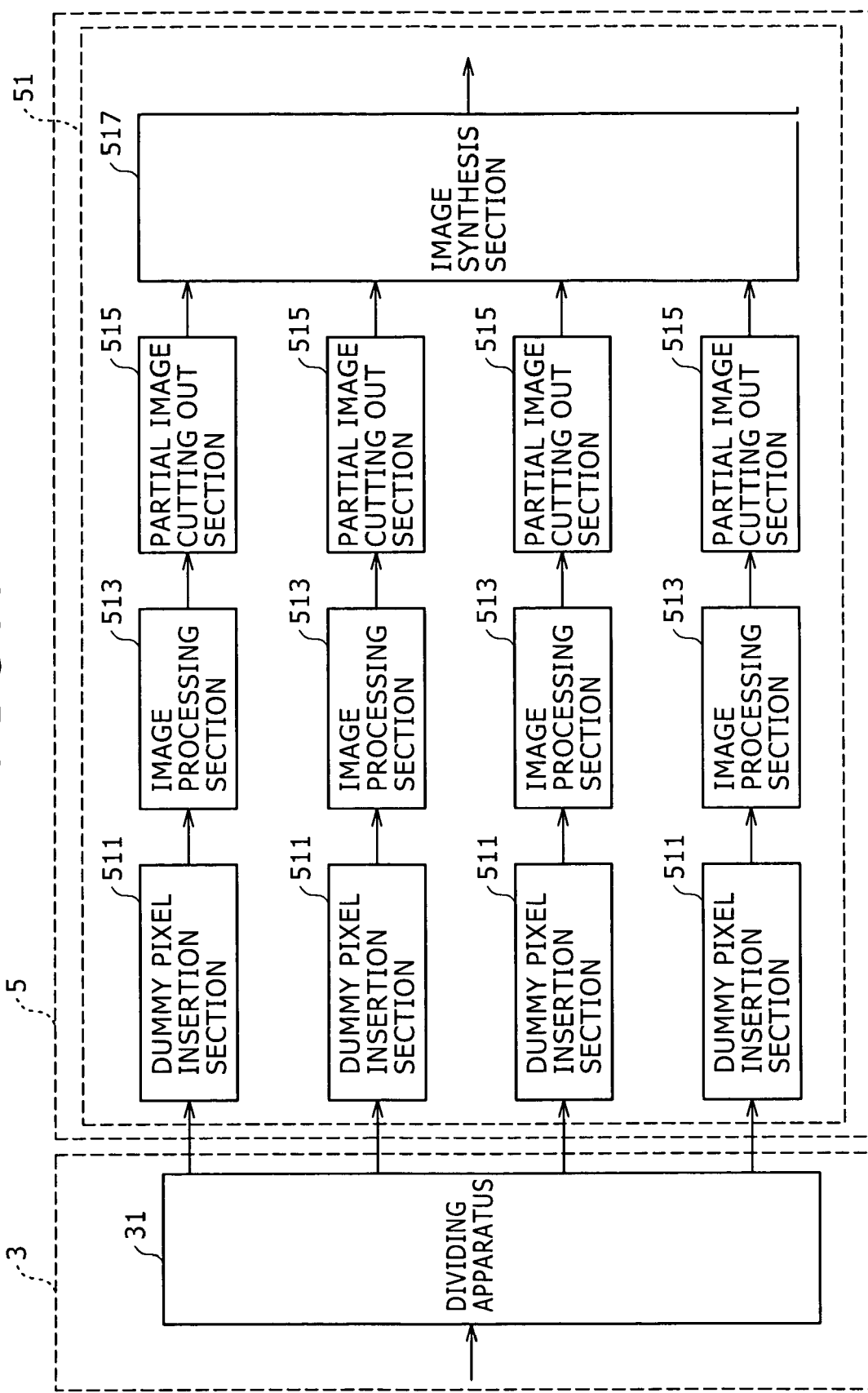
FIG. 7 is a block diagram showing an example of a configuration of an image re-synthesis apparatus shown in FIG. 5.

FIG. 7 shows an example of a detailed configuration of the re-synthesis apparatus 51 incorporated in the display apparatus 5.

The re-synthesis apparatus 51 includes a dummy pixel insertion section 511, an image processing section 513, a partial image cutting out section 515, and an image synthesis section 517. Actually, the re-synthesis apparatus 51 includes four dummy pixel insertion sections 511, four image processing sections 513 and four partial image cutting out sections 515 corresponding to four data streams except the image synthesis section 517 thereof.

Each of the dummy pixel insertion sections 511 executes a process of producing dummy pixels by arithmetic operation from a divisional image (2K image) of a processing object and extrapolating the produced dummy pixels to an outside portion of an effective pixel region of the divisional image. In other words, each dummy pixel insertion section 511 executes a process of temporarily expanding the picture frame.

Here, each dummy pixel insertion section 511 applies, for example, a method of extrapolating a copy of pixels positioned at an end portion of the effective pixel region, or another method of folding back pixels positioned in the proximity of an end portion of the effective pixel region symmetrically with respect to a line on the end portion to extrapolate the pixels. Or, each dummy pixel insertion section 511 applies a further method of producing dummy pixels using a polynomial approximation method or a like method and extrapolating the pixels, or a still further method of passing pixels inserted by any of the methods described through a spatial low-pass filter (LPF).

In actual extrapolation arithmetic operation, a method wherein an arithmetic operation method used is fixed or another method wherein a plurality of arithmetic operation methods are selectively applied is applied based on the balance between the effect on the visual sense and the difficulty in arithmetic operation.

It is to be noted that it is known as an empirical rule that a natural image exhibits a high correlation between adjacent pixels. Accordingly, dummy pixels produced based on pixels in a divisional image have a high correlation to pixels which originally exist on the outside of the divisional image although the dummy images are produced by a comparatively simple method.

Figure 8A:
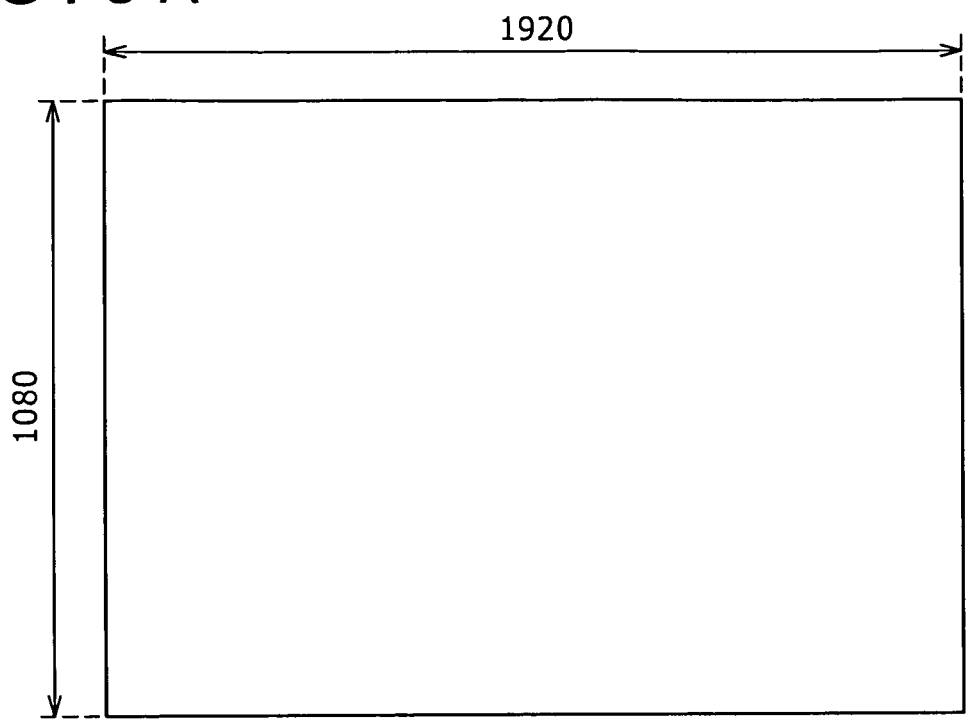
FIGS. 8A and 8B are schematic views illustrating an example of an insertion position of dummy pixels.
Figure 8B:
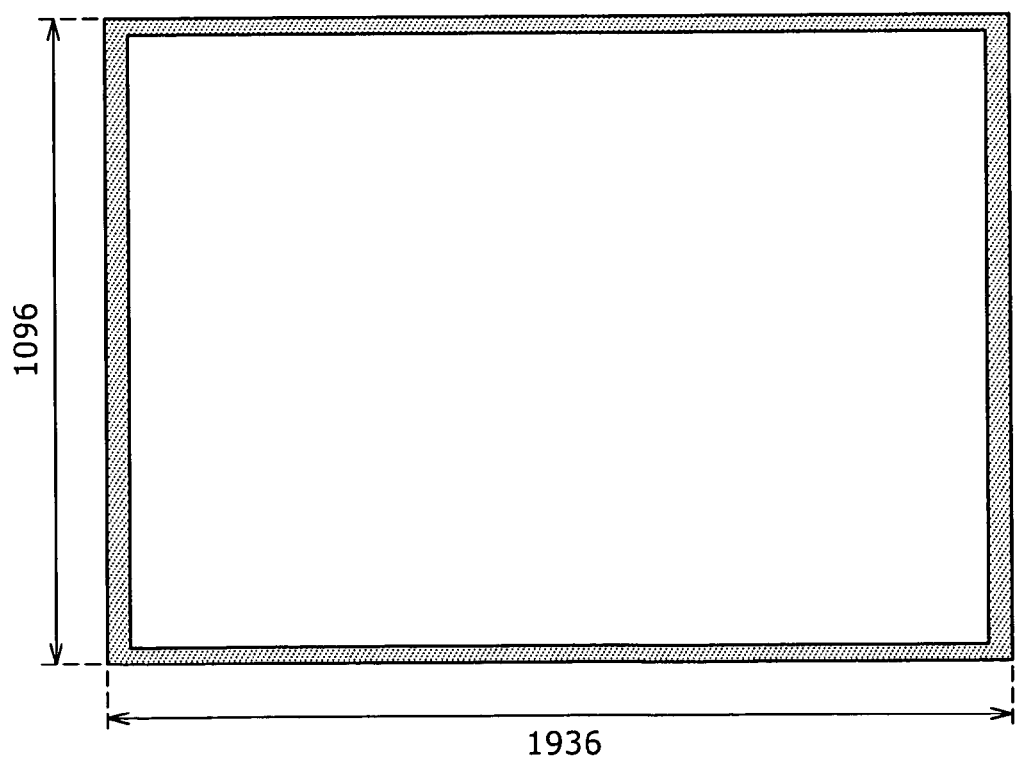

FIGS. 8A and 8B illustrate an extrapolation position of dummy pixels adopted in the present embodiment. In particular, FIG. 8A shows an example of the pixel size of a divisional image (2K image) inputted to the dummy pixel insertion section 511. Here, since the divisional image is a full HD image, the pixel size is horizontally 1,902 pixels×vertically 1,080 pixels.

FIG. 8B shows an example of the pixel size of an expanded image after insertion of dummy pixels. In particular, FIG. 8B shows an example wherein eight dummy pixels are inserted on each of the opposite sides of the pixel size of FIG. 8A in the horizontal direction and the vertical direction.

Referring back to FIG. 7, each of the image processing sections 513 is a processing device which executes a spatial signal process for the expanded image of FIG. 8B produced as described above. The spatial signal process may be, for example, a two-dimensional noise filtering process, a spatial frequency conversion process, a contour emphasis process or the like.

In the signal processes mentioned, the arithmetic operation process has to have neighboring pixels. Therefore, where pixels at an end portion of an effective pixel region of an image of a processing object are processed, uncertain data or dummy data are inserted to the outer side of the effective pixel region to execute the arithmetic operation. Usually, black or gray data is used for such dummy pixels.

Also in this instance, a similar arithmetic operation is executed. FIG. 9 illustrates a processing principle of a contour emphasis process. Since the substance of the contour emphasis process is a known technique, detailed description of the same is omitted herein.

Basically, a process of extracting high frequency components by calculating the difference between an original image and a delayed image of the original image, multiplying the extracted high frequency components by a proportional coefficient $\alpha$, which is 0.3 in FIG. 9, and adding a result of the multiplication to the original signal is executed.

FIG. 10 shows an example of a configuration of a finite impulse response (FIR) filter which implements the contour emphasis process.

Also in the configuration shown in FIG. 10, at an end portion of an effective region of an expanded image, an influence of dummy pixels appears. It is to be noted, however, that such end portion pixels exist on the outside of the effective pixel region of the divisional image (2K image). Therefore, the result of the spatial process does not have an influence on the inner side of the effective pixel region of the divisional image (2K image).

Meanwhile, for a spatial process for pixels positioned at an end portion of an effective pixel region of a divisional image (2K image), dummy pixels having a high correlation to pixels which are positioned at the end portion of the effective pixel region as described hereinabove are used. Accordingly, it is expected that a result of the process for the end portion of the effective pixel region of the divisional image (2K image) is a spatial process result which is natural also to the visual sense.

Referring back to FIG. 7, each of the partial image cutting out sections 515 executes a process of removing image components corresponding to dummy pixels inserted to the spatially processed image formerly (FIG. 8B) to reproduce a divisional image of an image size equal to that when the divisional image is inputted. In other words, each partial image cutting out section 515 executes a process of reproducing a 2K image.

The image synthesis section 517 executes a process of synthesizing four divisional 2K images cut out in such a manner as described above by the partial image cutting out section 515 by patching to produce a re-synthesized image of an image size equal to that of the source image (4K×2K image).

(A-3) Flow of Processes and Advantages

FIGS. 11A to 11F schematically illustrate the substance of a series of processes executed by the image display system 1 described hereinabove.

First, a process of dividing an image of the 4K×2K resolution shown in FIG. 11A into four divisional images shown in FIG. 11B is executed. Naturally, the divisional images are of the full HD resolution.

Then, a process of inserting dummy pixels produced based on the divisional images to the outer side of the divisional images to expand the image frame of the divisional images. By the process, expanded images are produced as seen in FIG. 11C.

The, a spatial signal process of the expanded images is executed as seen in FIG. 11D, and a removing process of noise components included in the divisional images and a contour emphasis process are executed.

Thereafter, the inserted portions of the dummy pixels are removed from the expanded images. In other words, images having same effective pixel regions as those of the full HD resolution are cut out from the expanded images as seen in FIG. 11E.

Finally, the four reproduced divisional images are synthesized by patching to produce a 4K×2K image of an image size equal to that of the source image as seen in FIG. 11F.

A result of the process is described in connection with a particular example. FIGS. 12A and 12B show an example of screens of divisional images (2K images) to be re-synthesized and a 4K×2K image after the re-synthesis. In particular, FIG. 12A shows an example of images obtained by spatially processing images obtained by inserting a copy of end portion pixels to the outer side of divisional images (2K images) and then extracting images of the original image size.

FIG. 12B shows an example of a 4K×2K image obtained by synthesizing the divisional images of FIG. 12A by patching.

Figure 3:
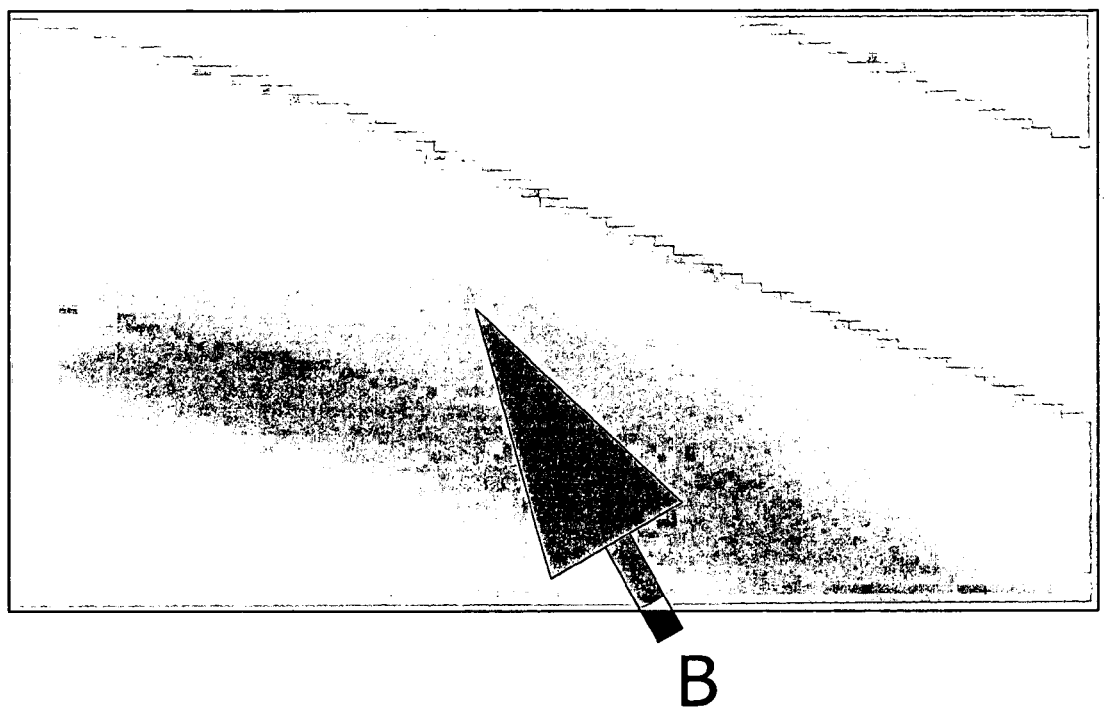
FIG. 3 is an enlarged view of a portion of two upper and lower divisional images positioned on the left side of FIG. 1A around a boundary between divisional images.
Figure 4:
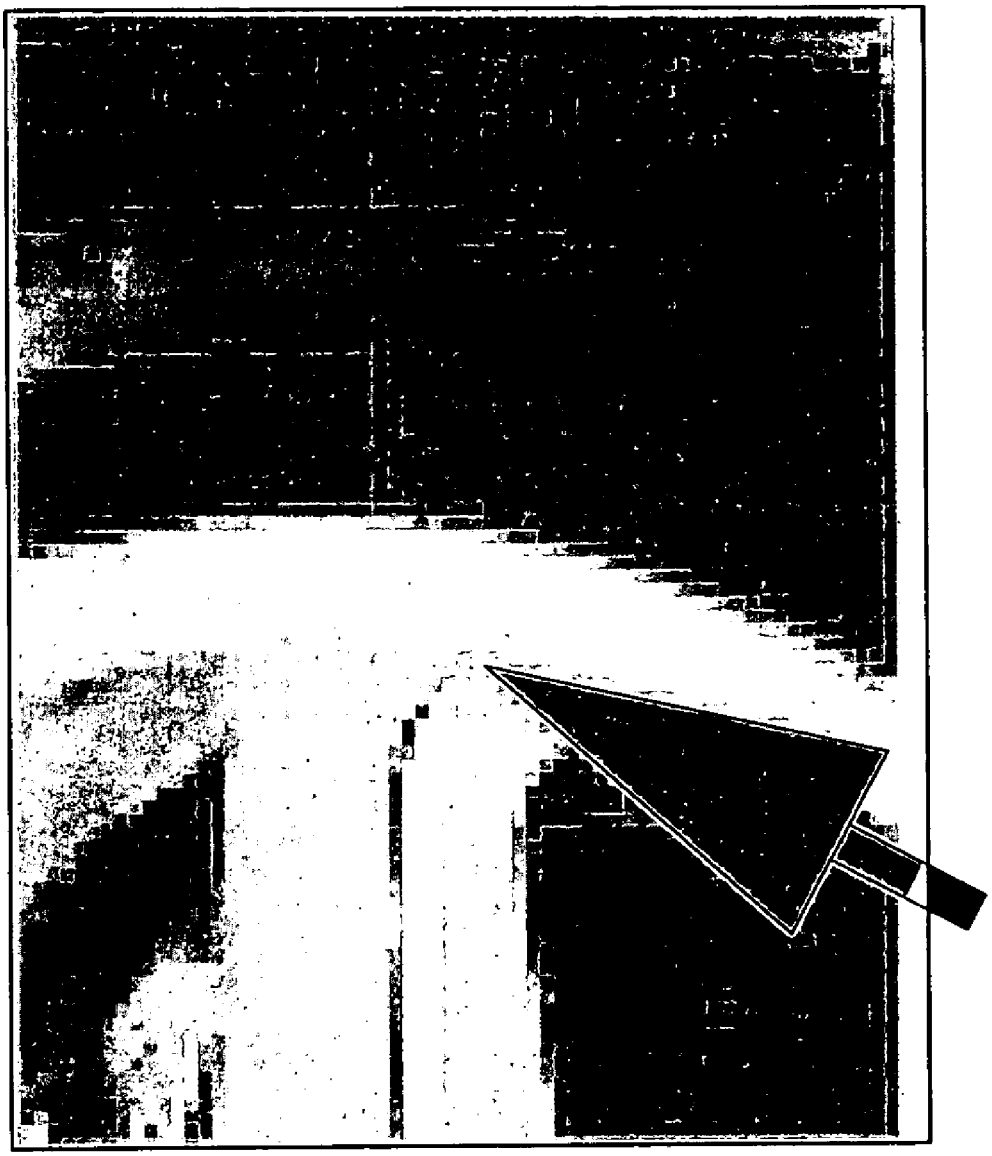
FIG. 4 is an enlarged view of a portion of two right and left divisional images positioned on the lower stage of FIG. 1A around a boundary between divisional images.
Figure 13:
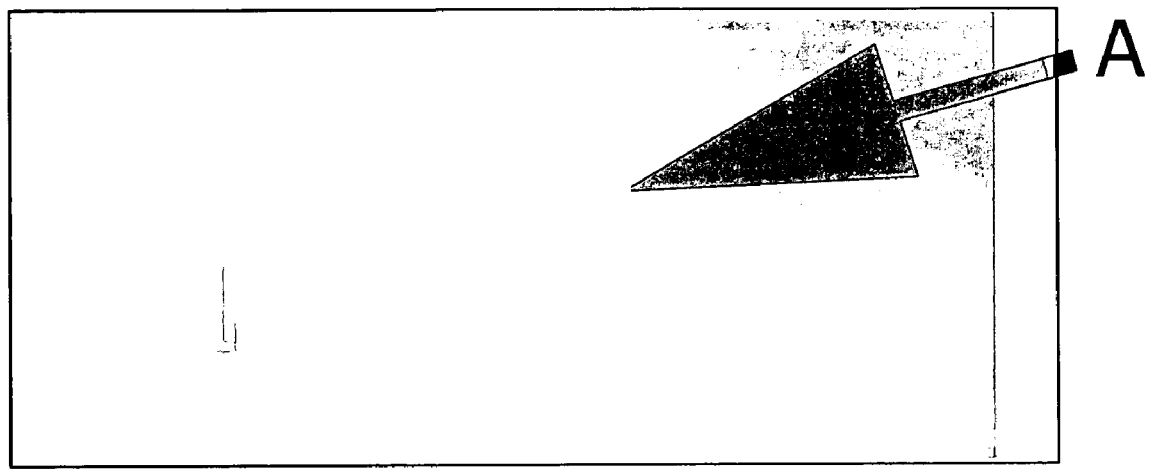
FIG. 13 is an enlarged view of a portion of two right and left divisional images positioned on the upper stage of FIG. 12A around a boundary between divisional images.
Figure 14:
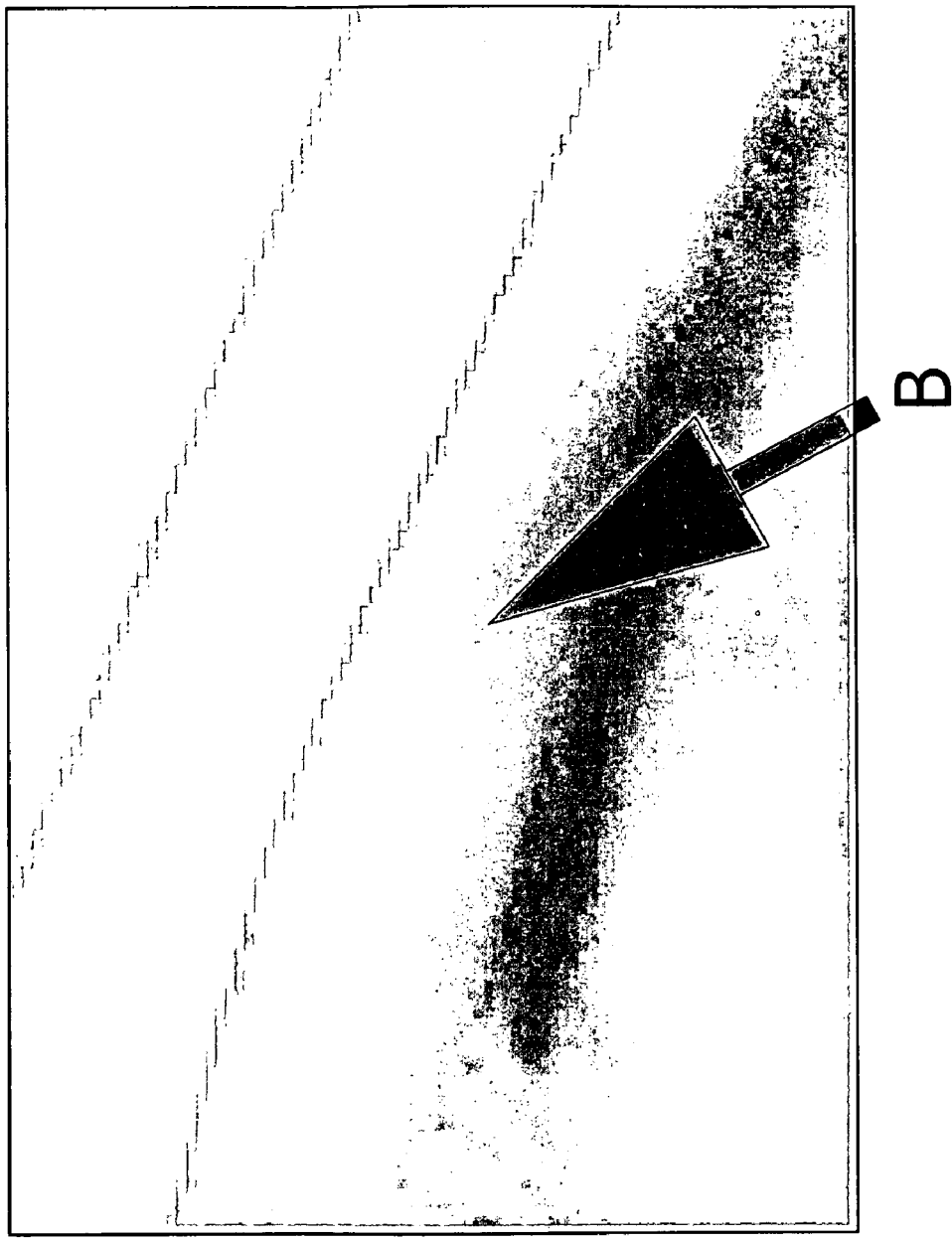
FIG. 14 is an enlarged view of a portion of two upper and lower divisional images positioned on the left side of FIG. 12A around a boundary between divisional images.
Figure 15:
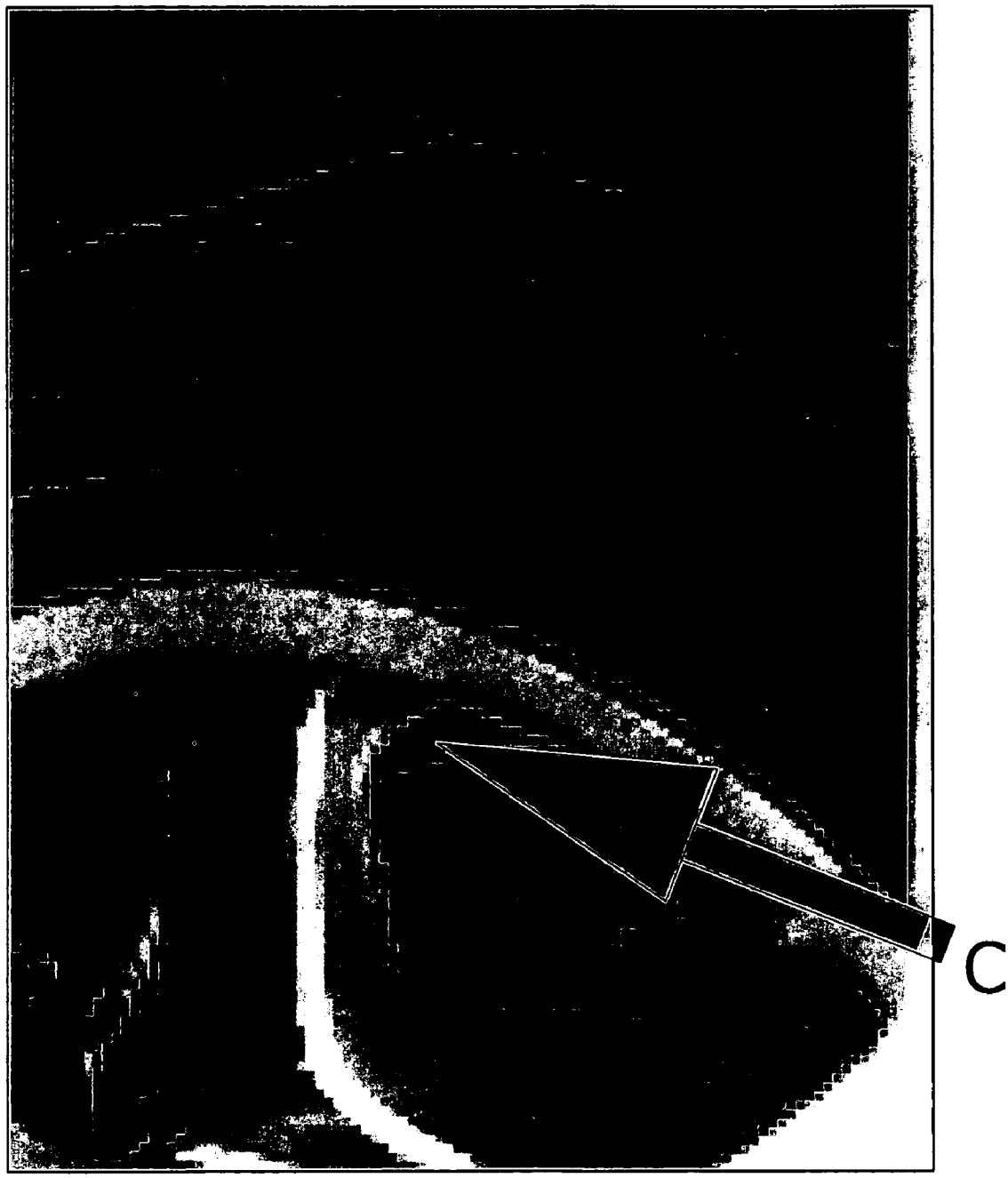
FIG. 15 is an enlarged view of a portion of two right and left divisional images positioned on the lower stage of FIG. 12A around a boundary between divisional images.

FIGS. 13 to 15 show enlarged views of portions of divisional images around boundaries. It is to be noted that the locations of the enlarged views of FIGS. 13 to 15 correspond to those of the enlarged views of FIGS. 2 to 4, respectively.

In particular, FIG. 13 shows an enlarged view of a portion indicated by an arrow mark A in FIG. 12B. In particular, FIG. 13 shows an enlarged view of a portion in the proximity of the boundary between two right and left divisional images positioned on the upper stage of FIG. 12A. In the 4K×2K image obtained by the processing method described above, no stripe can be found at the boundary position between the two divisional images.

FIG. 14 shows an enlarged view of another portion indicated by an arrow mark B in FIG. 12B. In particular, FIG. 14 shows an enlarged view of a portion in the proximity of the boundary between two upper and lower divisional images positioned on the left side of FIG. 12A. Also here, no stripe can be found at the boundary position between the two divisional images.

FIG. 15 shows an enlarged view of a further portion indicated by an arrow mark C in FIG. 12B. In particular, FIG. 15 shows an enlarged view of a portion in the proximity of the boundary between two right and left divisional images positioned on a lower stage of FIG. 12A. Also in this instance, no stripe can be found at the boundary position between the two divisional images.

As described above, even where divisional images formed by dividing a source image such that the images of neighboring regions may not overlap with each other are inputted, by extrapolating dummy pixels produced based on the divisional images to expand the picture frames of the divisional images and executing a spatial signal process and then removing the image regions corresponding to the dummy pixels, a 4K×2K image can be synthesized which does not include disorder of an image in the proximity of the boundaries of divisional images.

The present image re-synthesis method is particularly effective where a source image has an image size equal to an integral number of times the image size prescribed by a transmission standard and divisional images to be produced for transmission cannot include image components which overlap with each other.

In other words, even where image components which overlap with each other are not included in divisional images, disorder of an image at end portions of divisional images by a noise removing process, a contour emphasis process and other spatial signal processes can be prevented. Consequently, an image of high quality can be reproduced.

(B) Other Embodiments (a) In the embodiment described hereinabove, dummy pixels are inserted to all of the four sides of each divisional image, that is, to all of the upper, lower, right and left sides of each divisional image, to expand the picture frame as seen from FIGS. 8A and 8B.

However, where the substance of an image or the visual sense characteristic of the human being is taken into consideration, another technique of inserting dummy pixels only to the opposite right and left sides (in the horizontal direction) of a divisional image may be adopted. Actually, also in the example described hereinabove, the boundary between divisional images neighboring upwardly and downwardly with each other is not conspicuous.

Figure 16A:
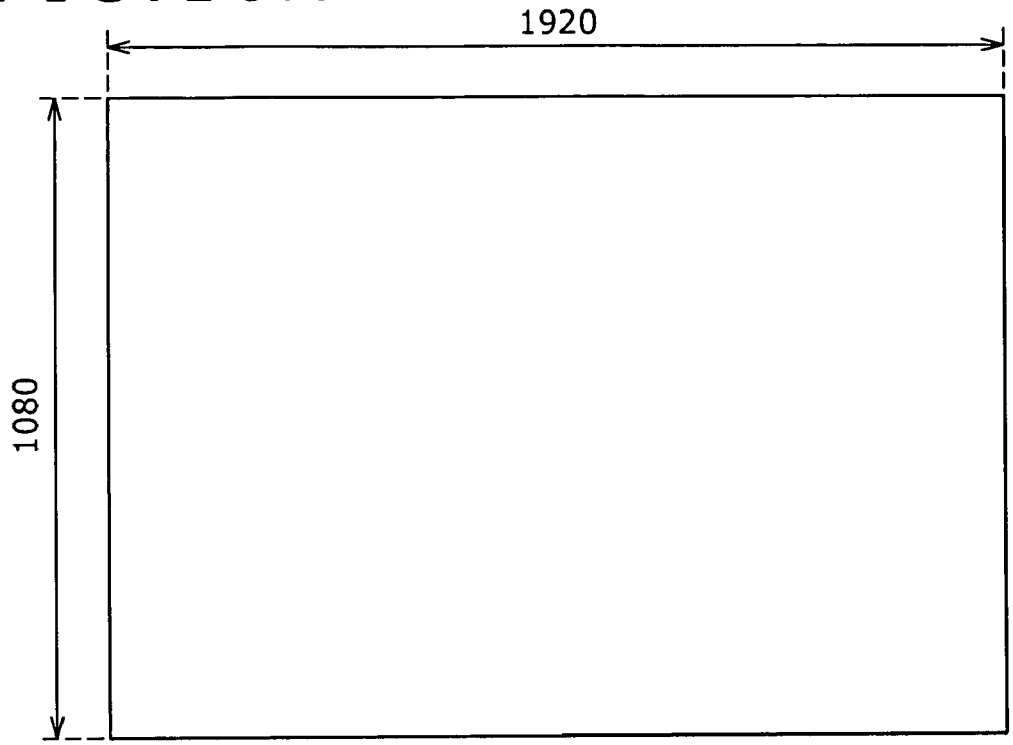
FIGS. 16A and 16B are schematic views illustrating another example of an insertion position of dummy pixels.
Figure 16B:
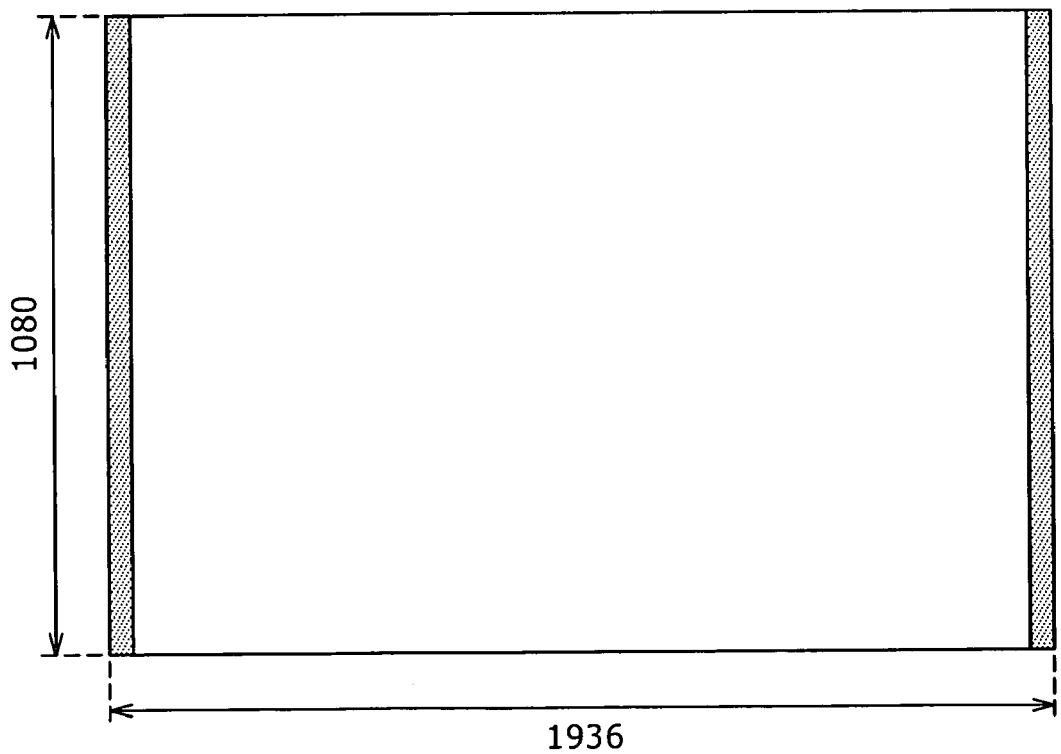

FIGS. 16A and 16B illustrate an example of an extrapolation position of dummy pixels. In particular, FIG. 16A shows an example of the pixel size of a divisional image (2K image). Here, since the divisional image is a full HD image, it includes 1,920 horizontal pixels×1,080 vertical pixels.

FIG. 16B shows an example of a pixel size of an expanded image after insertion of dummy pixels. In FIG. 16B, eight dummy pixels are inserted in the horizontal direction to the opposite sides of the divisional image.

Figure 17A:
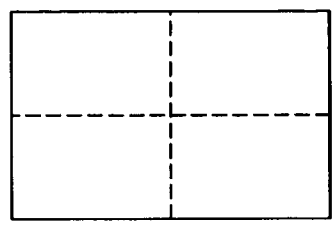
FIGS. 17A to 17F are schematic views illustrating another example of the substance of a series of processes executed by the image display system.
Figure 17B:
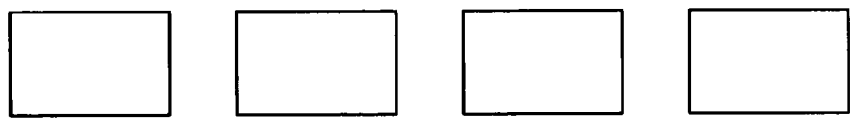
Figure 17C:
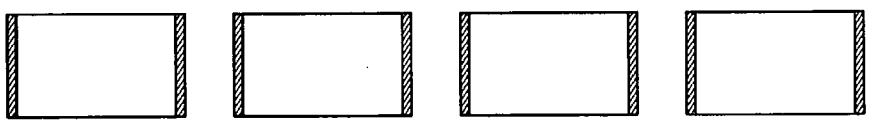
Figure 17D:
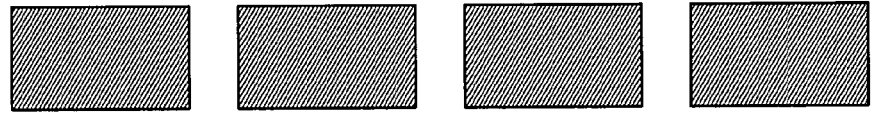
Figure 17E:
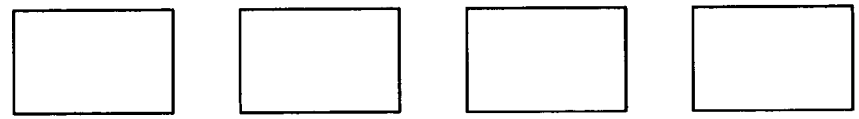
Figure 17F:
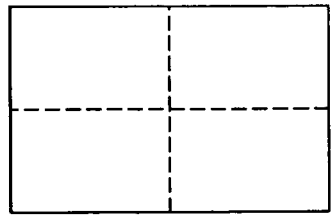

FIGS. 17A to 17F illustrate the substance of a series of processes where the present image expansion method is adopted. Although the substance of the processes is quite same as that described hereinabove with reference to FIGS. 11A to 11F, the image size in FIGS. 17C to 17E is horizontally elongated from that in FIGS. 11C to 11E.

It is to be noted that the present processing method can decrease the number of pixels of an object of signal processing although the number is small, and therefore, the present processing method is effective also to reduction of the processing load.

Further, in the present processing method, dummy pixels are inserted to the opposite sides of all divisional images in the horizontal direction.

However, where it is taken into consideration that disorder at a coupling portion between divisional images is conspicuous at a central portion of a screen at which attention of an observer is concentrated, a technique of inserting dummy pixels to only central portions of a screen may be adopted.

Figure 18A:
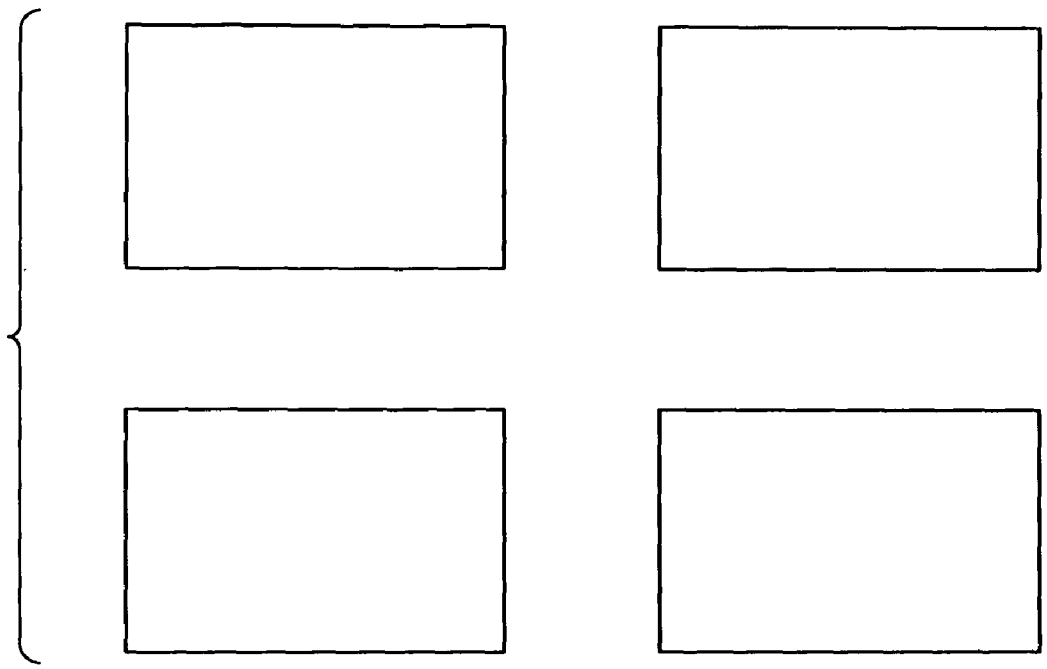
FIGS. 18A and 18B are schematic views illustrating a further example of an insertion position of dummy pixels.
Figure 18B:
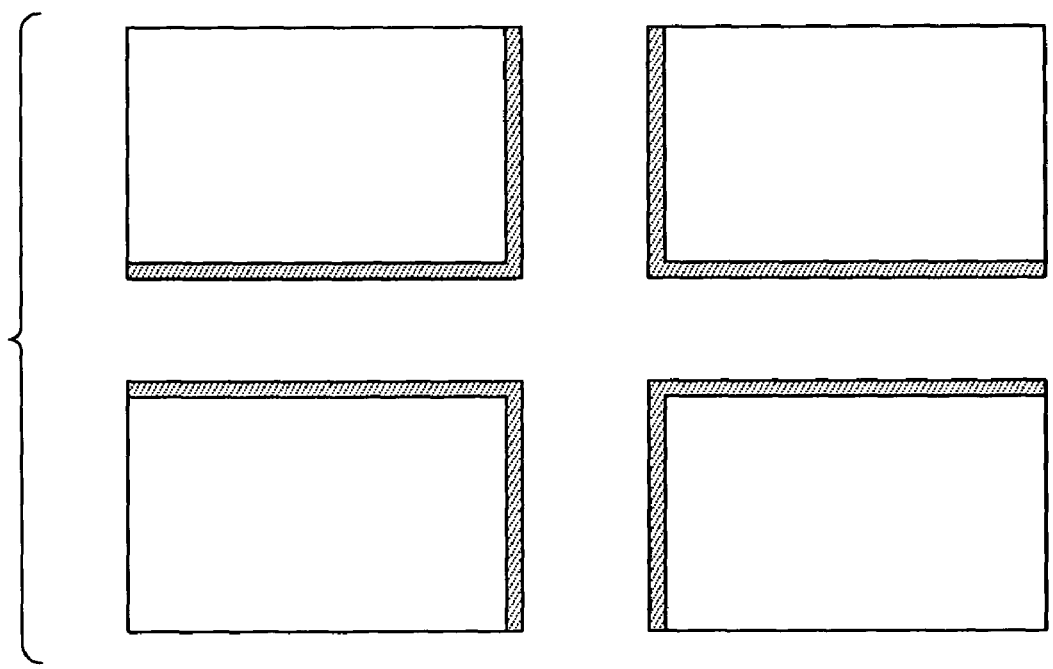

For example, dummy pixels may be inserted only to two sides of each divisional pixel nearer to the center of the screen as seen in FIGS. 18A and 18B.

In this instance, with regard to the divisional image at the left upper corner, dummy pixels are inserted to the right side and the lower side of the image region. With regard to the divisional image at the right upper corner, dummy pixels are inserted to the left side and the lower side of the image region. With regard to the divisional image at the left lower corner, dummy pixels are inserted to the right side and the upper side of the image region. With regard to the divisional image at the right lower corner, dummy pixels are inserted to the left side and the upper side of the image region.

Figure 19A:
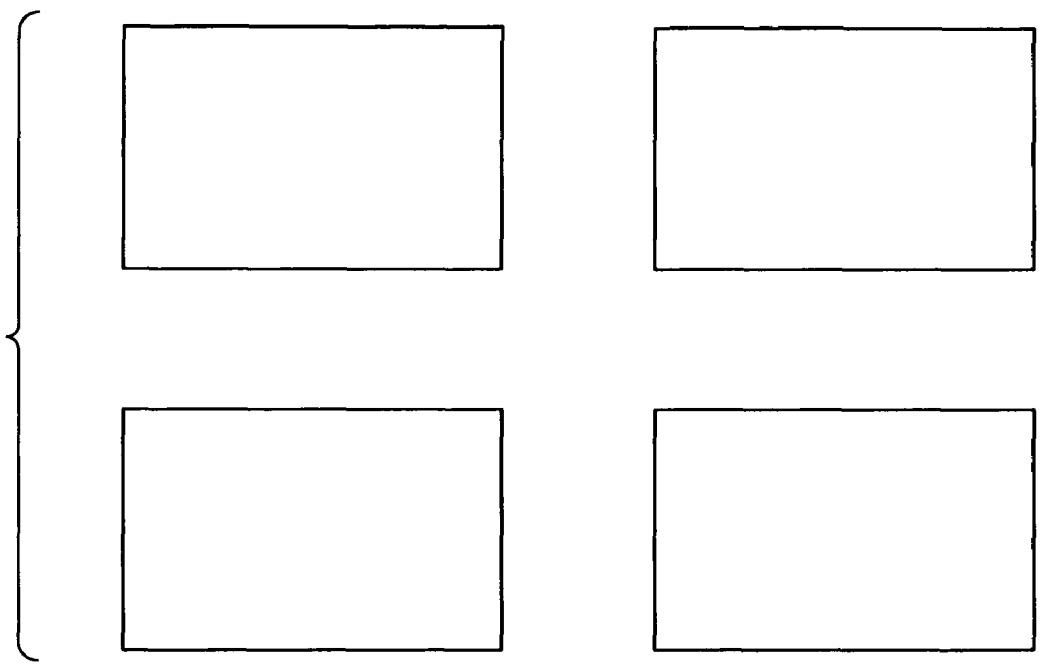
FIGS. 19A and 19B are schematic views illustrating a still further example of an insertion position of dummy pixels.
Figure 19B:
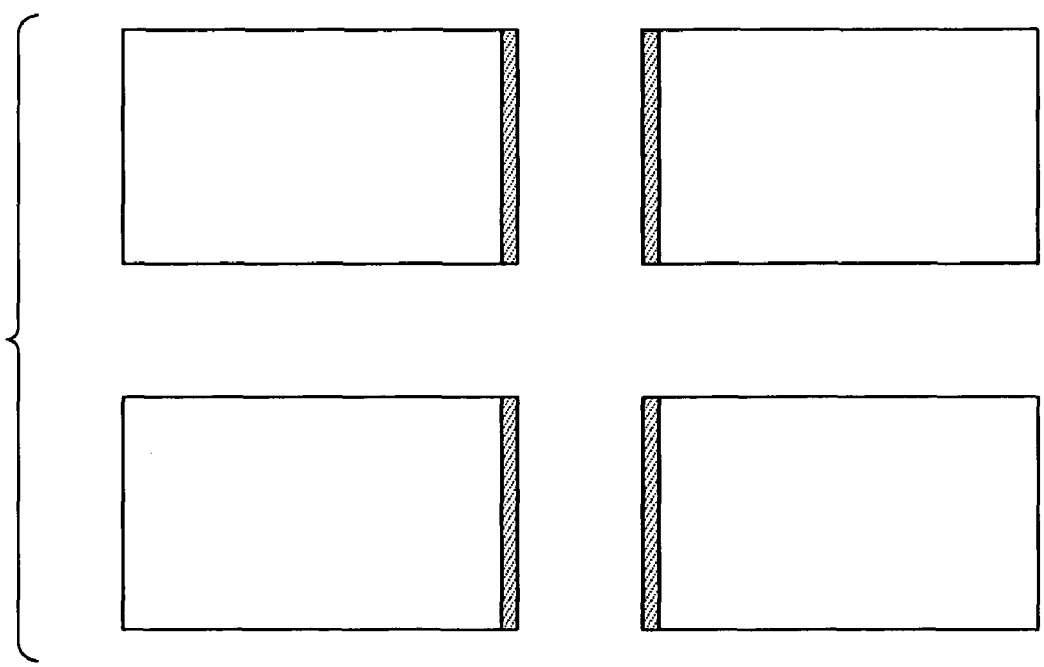

Or, dummy pixels may be inserted only to one side of each divisional region nearer to the center of the screen as seen in FIGS. 19A and 19B.

In this instance, with regard to the divisional image at the left upper corner, dummy pixels are inserted only to the right side of the image region. With regard to the divisional image at the right upper corner, dummy pixels are inserted only to the left side of the image region. With regard to the divisional image at the left lower corner, dummy pixels are inserted only to the right side of the image region. With regard to the divisional image at the right lower corner, dummy pixels are inserted only to the left side of the image region.

(b) In the example of the form described hereinabove, the pixel size of a source image is equal to four times that of an image size prescribed by a transmission standard.

However, the present invention can be applied widely where the image size of a source image is equal to N (N is an integer equal to or greater than two) times the image size prescribed in a transmission standard.

(c) In the embodiment described above, the HD-SDI standard is applied to transmission of divisional images.

However, any transmission standard which exists at a point of time at which the present invention is carried out can be applied. For example, at the point of time at which the present invention is filed for patent, the SDI (serial digital interface) standard can be applied.

(d) In the embodiment described hereinabove, a processing object is a 4K×2K image (moving picture).

However, the present invention can be applied similarly also to processing of a still picture.

(e) The substance of the process of the image re-synthesis apparatus described hereinabove in the description of the preferred embodiment can be implemented also as a program which is executed by a digital signal processor or a general-purpose processor. In this instance, the program may be stored in and distributed together with a storage medium or may be distributed through a network. It is to be noted that the storage medium may be a magnetic storage medium, an optical storage medium, a semiconductor storage medium or any other storage medium.

(f) In the embodiment described hereinabove, the image re-synthesis apparatus is incorporated in a display apparatus. However, the image re-synthesis apparatus may otherwise be incorporated in an editing apparatus, a printing apparatus or any other image processing apparatus.

(g) The embodiment described above may be modified variously within the spirit and scope of the present invention. Also various modifications and applications may be made by creation or combination based on the disclosure of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image display system, comprising:
a dividing apparatus configured to divide a source image into N divisional images such that the images of neighboring regions may not overlap with each other and signal the N divisional images, N being a natural number equal to or greater than two;
N transmission lines configured to individually transmit the N divisional images;
N dummy pixel insertion sections configured to produce dummy pixels individually based on the corresponding divisional images and insert the produced dummy pixels individually to the outer side of the corresponding divisional images to produce expanded images;
each N image processing section configured to apply a spatial signal process individually to the corresponding expanded images;
N divisional image cutting out sections configured to remove image components corresponding to the dummy pixels individually from the corresponding spatially processed images to cut out divisional images of an image size equal to the size of the divisional images signaled from said dividing apparatus; and
an image synthesis section configured to patch the cut out N divisional images to produce a re-synthesized image of an image size equal to the image size of the source image.

2. The image display system according to claim 1, wherein said transmission lines comply with the IID-SDI standard, and the source image is given with a resolution equal to the resolution of the HD-SDI standard.

3. The image display system according to claim 1, wherein said dividing apparatus is incorporated in an image pickup apparatus.

4. The image display system according to claim 1, wherein said dividing apparatus is incorporated in an image reproduction apparatus.

5. The image display system according to claim 1, wherein said dividing apparatus is incorporated in an image editing apparatus.

6. The image display system according to claim 1, wherein said dividing apparatus is incorporated in a switching apparatus.

7. The image display system according to claim 1, wherein said dummy pixel insertion section inserts the dummy pixels by a method of extrapolating a copy of pixels positioned at an end portion of an effective pixel region, another method of folding back pixels positioned in the proximity of an end portion of the effective pixel region symmetrically with respect to a line on the end portion to extrapolate the pixels, a further method of producing dummy pixels using a polynomial approximation method extrapolating the pixels, or a still further method of passing pixels inserted by any of the methods through a spatial low-pass filter.

8. A display apparatus to which N divisional images formed by dividing a source image such that the images of neighboring regions may not overlap with each other are inputted, N being a natural number equal to or greater than two, comprising:
N dummy pixel insertion sections configured to produce dummy pixels individually based on the corresponding divisional images and insert the produced dummy pixels individually to the outer side of the corresponding divisional images to produce expanded images;
each N image processing section configured to apply a spatial signal process individually to the corresponding expanded images;

N divisional image cutting out sections configured to remove image components corresponding to the dummy pixels individually from the corresponding spatially processed images to cut out divisional images of an image size equal to the size of the divisional images signaled from said dividing apparatus; an image synthesis section configured to patch the cut out N divisional images to produce a re-synthesized image of an image size equal to the image size of the source image; and a display device configured to display the produced re-synthesized image.

9. The display apparatus according to claim 8, wherein said dummy pixel insertion section inserts the dummy pixels by a method of extrapolating a copy of pixels positioned at an end portion of an effective pixel region, another method of folding back pixels positioned in the proximity of an end portion of the effective pixel region symmetrically with respect to a line on the end portion to extrapolate the pixels, a further method of producing dummy pixels using a polynomial approximation method extrapolating the pixels, or a still further method of passing pixels inserted by any of the methods through a spatial low-pass filter.

10. An image re-synthesis apparatus to which N divisional images formed by dividing a source image such that the images of neighboring regions may not overlap with each other are inputted, N being a natural number equal to or greater than two, comprising:

N dummy pixel insertion sections configured to produce dummy pixels individually based on the corresponding divisional images and insert the produced dummy pixels individually to the outer side of the corresponding divisional images to produce expanded images;

each N image processing section configured to apply a spatial signal process individually to the corresponding expanded images;

N divisional image cutting out sections configured to remove image components corresponding to the dummy pixels individually from the corresponding spatially processed images to cut out divisional images of an image size equal to the size of the divisional images signaled from said dividing apparatus; and an image synthesis section configured to patch the cut out N divisional images to produce a display image of an image size equal to the image size of the source image.

11. The image re-synthesis apparatus according to claim 10, wherein said dummy pixel insertion section inserts the dummy pixels by a method of extrapolating a copy of pixels positioned at an end portion of an effective pixel region, another method of folding back pixels positioned in the proximity of an end portion of the effective pixel region symmetrically with respect to a line on the end portion to extrapolate the pixels, a further method of producing dummy pixels using a polynomial approximation method extrapolating the pixels, or a still further method of passing pixels inserted by any of the methods through a spatial low-pass filter.

12. A non-transitory computer-readable recording medium on which a program is recorded, said program causing a computer, to which N divisional images formed by dividing a source image such that the images of neighboring regions may not overlap with each other are inputted, N being a natural number equal to or greater than two, to execute the steps of:

producing dummy pixels individually based on the corresponding divisional images and inserting the produced dummy pixels individually to the outer side of the corresponding images to produce expanded images;

applying a spatial signal process individually to the expanded images; removing image components corresponding to the dummy pixels individually from the corresponding spatially processed images to cut out divisional images of an image size equal to the size of the divisional images to be re-synthesized; and patching the cut out N divisional images to produce a display image of an image size equal to the image size of the source image.

13. The non-transitory computer-readable recording medium according to claim 12, wherein the dummy pixels are inserted by a method of extrapolating a copy of pixels positioned at an end portion of an effective pixel region, another method of folding back pixels positioned in the proximity of an end portion of the effective pixel region symmetrically with respect to a line on the end portion to extrapolate the pixels, a further method of producing dummy pixels using a polynomial approximation method extrapolating the pixels, or a still further method of passing pixels inserted by any of the methods through a spatial low-pass filter.

* * * * *